Figure 1:
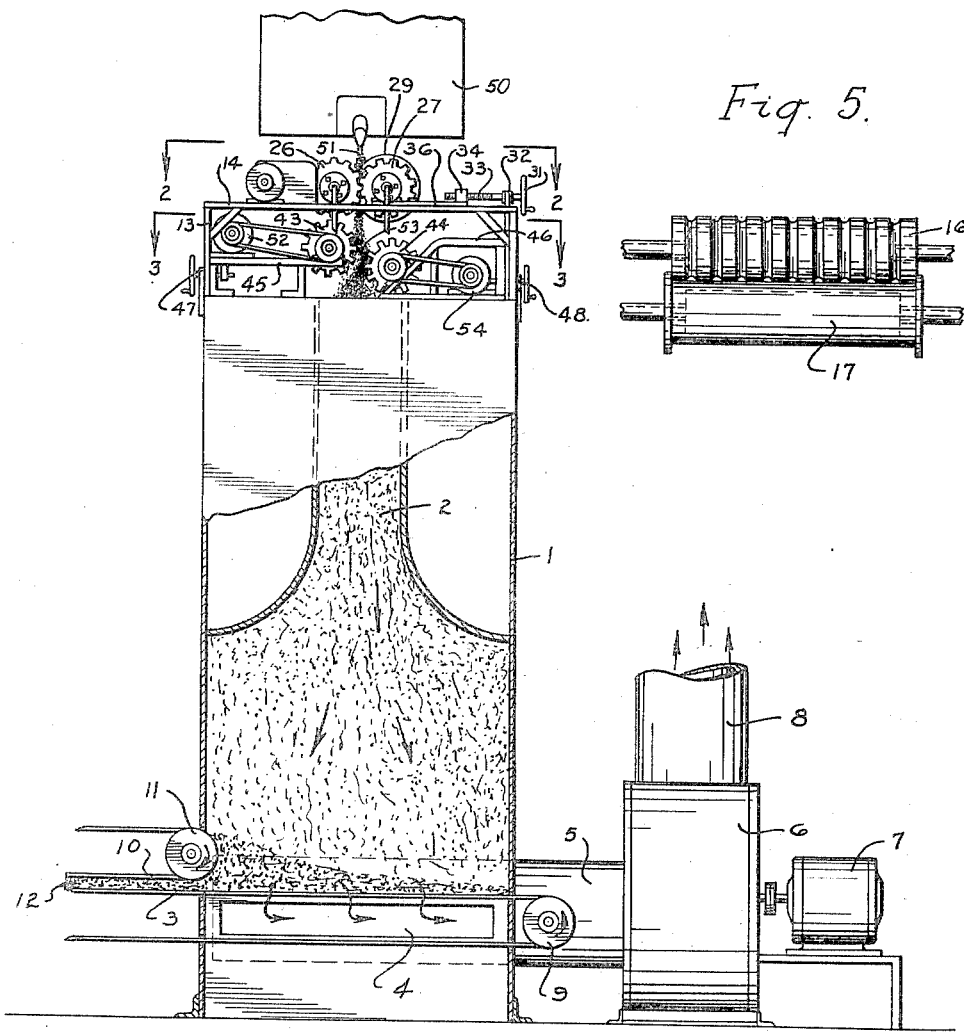

Dec. 20, 1949     C. D. RICHARDSON     2,491,766
MINERAL WOOL MAKING MEANS

Filed Oct. 20, 1947     2 Sheets-Sheet 1

INVENTOR.
C. D. RICHARDSON
BY

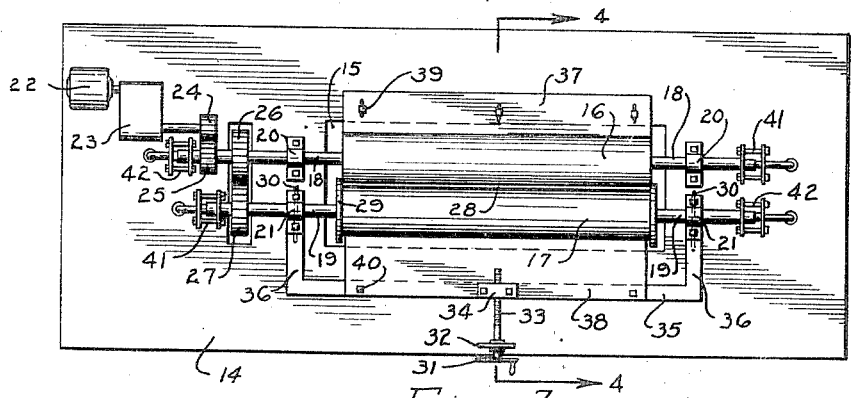

Patented Dec. 20, 1949

2,491,766

UNITED STATES PATENT OFFICE 2,491,766

MINERAL WOOL MAKING MEANS

Charles D. Richardson, Anderson, Ind.

Application October 20, 1947, Serial No. 780,886

4 Claims. (Cl. 18—2.5)

This invention relates to the apparatus for the production of mineral wool, and more specifically to the means for mechanically dividing a stream of molten rock or slag into a number of streams while cooling it to a desired viscosity and then disintegrating it by mechanical means and streaming it out by passage into a high velocity air stream to dissipate it into fibres, which are then collected and used in loose form, treated with a binder and formed into blocks or bats in a well known manner, to be used for insulation, or granulated in a conventional manner for specific uses where granular forms of insulation are required.

In the manufacture of rock or slag wool, commonly known as mineral wool, the molten material is usually run from a cupola or other furnace in a single stream which is intercepted by a blast of steam which disintegrates and projects the disintegrated material into a settling or blow chamber. The nozzles commonly used for disintegrating and projecting the molten slag can handle only five to seven hundred pounds of slag per hour. Increasing the rate of flow of the molten slag was found to produce an inferior and unsalable product, and to increase the temperature of the settling chamber to a point so high that any binder applied to the wool would be burned out before it passed out of the chamber into the drying oven.

Among the attempts previously made to increase production by dividing the stream into a number of streams for use of additional disintegrating nozzles was the separation of a large stream into two streams by letting it run into the center of an angle iron and letting it flow out of each end of the angle iron as two smaller streams, then letting each of these smaller streams run into another angle iron for dividing each of these streams into still smaller streams, and so on until the proper size streams were obtained. For a higher increase in production a greater number of dividers had to be used. But the number of such dividers that could be used were limited by the fact that the slag chills on these angle irons and causes trouble if too many are used.

The object of the present invention is to provide means whereby increase and improvement in production of mineral wool can be obtained without running into the difficulties outlined above.

Another object is to use a ribbon form of stream for the molten material and a correspondingly wide stream nozzle or mechanical disintegrating means.

Another object is to provide mechanical means for separating a large stream of the molten material into a number of sufficiently smaller streams for use with the usual steam nozzle for each of the streams, whereby the troubles due to chilling are avoided and efficient operation on a large scale may be obtained.

Another object is to provide the separating means as above and use the several streams with a common disintegrating means therefor and common means for streaming out the disintegrated particles by passing them into a high velocity air current to dissipate them into fibres, which are then cooled and collected for various insulation purposes.

Another object is to provide separating means as above with means for adjusting the size of the separate streams.

Another object is to make the above common disintegrating means in the form of a long spur gear revolving at high speed and having its periphery intercept all the lined up streams simultaneously at an acute angle, and to make the common streaming out means in the form of another similar gear spaced from said disintegrating gear in a direction therefrom to catch the disintegrated particles and stream them out into the path of high velocity air for dissipation into fibres.

Another object is to arrange the streams to move vertically downward, placing the disintegrating gear below the source of said streams and to one side thereof, and to place the streaming out gear somewhat lower and to the other side of said streams, causing both gears to revolve at high speed to disintegrate said streams and throw the disintegrated particles against the lower gear.

Another object is to make the gears in the above apparatus both vertically and horizontally adjustable to obtain the results desired.

Another object is to provide variable speed drive means for said gears whereby their speeds may be individually adjusted to suit requirements for obtaining best results.

Another object is to connect the high speed air stream passage to a settling chamber or tank where the fibres are further cooled and settle down to the floor of the tank.

Another object is to provide a foraminous conveyor belt for the floor of said chamber or tank and an opening in the wall of the tank on the delivery end of said conveyor belt for moving the fibres accumulated thereon outside of said tank continuously during operation.

Another object is to provide a suction fan to draw the air in the above apparatus through said high velocity air passage, the settling tank and its floor whereby the fibres are collected thereon and continuously moved out in a layer on said conveyor belt.

Figure 5:
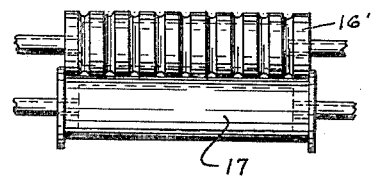
Figure 6:
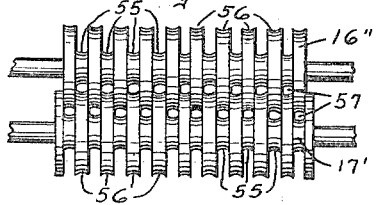

Other and more specific objects will appear in the following detailed description of some illustrative apparatus based on the present invention, having reference to the accompanying drawings, wherein:

Figure 1 is an elevational view partly in section of one form of apparatus made in accordance with the present invention, Figures 2 and 3 are plan views taken at the lines 2—2 and 3—3, respectively, in Figure 1, Figure 4 is a sectional view taken on the line 4—4 of Figure 2, Figure 5 is a plan view of a modified form of rollers which may be used in the stream forming or dividing portion of the apparatus, and Figure 6 is a plan view of another form of rollers that may be used in place thereof, for providing adjustability to the size of the several streams produced thereby, when the roller axes are moved toward or away from each other.

The apparatus shown in Figure 1 comprises a settling tank 1 having a restricted inlet passage 2, a floor formed by a foraminous conveyor belt 3 and an outlet 4 under the floor, leading into the inlet 5 of a large blower 6, operated by an electric motor 7 and having an exhaust 8. Conveyor belt 3 operates over pulley 9 passed through the walls of the tank with close clearances except at side of the tank where it leaves the tank. Here the tank is provided with an opening over the belt to permit the passage of a layer of fibres on the belt out of the tank. A second belt 10 running over pulley 11, mounted on said side of the tank a little above the first belt, acts to form a substantial seal with said tank and to compress the layer 12 of fibres between the belts 3 and 10 as the mineral wool is delivered from said opening.

An angle iron framework 13 holds the plate 14 elevated over the top of tank 1. Plate 14 has an opening 15 in it over the passageway 2. A pair of feeding rollers 16 and 17 are provided with shafts 18 and 19 and are rotatably mounted in bearings 20 and 21. These rollers are turned at a low rate (about 5 to 10 revolutions per minute) by the motor 22 through reduction gear unit 23, and gear train 24, 25, 26 and 27. Gears 26 and 27 are designed so as to allow a limited amount of adjustment of the clearance 28 between the rollers 16 and 17. Roller 17 has flanges 29 to form ends for the trough formed between the rollers above this clearance 28.

The bearings 21 are loosely mounted in cross slots 30 in the plate 14 for limited adjustment of said clearance, by means of control wheel 31 rotatably mounted on a lug 32 on plate 14 and having a threaded shank 33 cooperating with threaded lug 34 on bracket 35, which is connected to bearings 21 by arms 36.

Scraper plates 37 and 38 for the rollers 16 and 17 respectively, may be mounted as shown. Plate 37 is fastened to plate 14 by bolts 39. Plate 38 is fixed to bracket 35 by bolts 40. These scraper plates remove any material which might stick to the rollers.

Rollers 16 and 17 and their shafts 18 and 19 are hollow and are connected by packing gland joints 41 to a source of water supply for cooling and regulating the temperature of the material passed between the rollers as will be more fully described hereinafter. Similar packing gland joints 42 connect the outlets from the rollers to a water exhaust line.

Within the space under the plate 14, two spur gears 43 and 44 having a length substantially the same as the rollers 16 and 17, are mounted parallel to said rollers, on racks 45 and 46 which are slidably mounted on the top of tank 1 for horizontal adjustment by means of control wheels 47 and 48, respectively, having threaded shanks in engagement with said racks. Gear 44 is set in bearings 49 on rack 46 somewhat lower than the gear 43.

Gear 43 is the disintegrating gear and is adjusted inwardly far enough to intercept the streams 51 of molten material supplied by a cupola or other furnace 50 to the trough formed by rollers 16 and 17 and issuing from between the roller straight down at a low rate and at the proper viscosity, as determined by the temperature and speed of rotation of the rollers.

As the gear 43 is rotated by motor 52 mounted on the same rack 45, it disintegrates the streams 51 and throws the disintegrated particles 53 onto the gear 44, which is suitably adjusted to receive these particles and streams them out due to its high speed of rotation, sending them into the high velocity air passing through restricted passageway 2, where they are dissipated into fibres and cooled as they pass into the settling tank and float down to the floor. Gear 44 is driven by motor 54 mounted on rack 46. Motors 52 and 54 are of the variable speed type, and their speeds are adjusted to give best results.

As already indicated, the high velocity air stream through passageway 2 is caused by the suction blower 6 drawing the air through the settling tank and its inlet 5 and exhausting it through 8. This air as it passes through the belt 3 also helps to form a compact layer of fibres thereon as it moves through the tank. Roller pulley 11 also helps to compress the layer of fibres as it issues out of the tank between the two belts.

Rollers 16 and 17 are straight rollers and produce a ribbon form of stream of the molten material for disintegration by the gears. Figure 5 shows a modification of these gears. Gear 17 is still the same, but gear 16' is grooved circumferentially at regular intervals to produce a multi-stream supply to the common disintegrating gears.

Figure 6 shows a further modification wherein gear 16" has deeper grooves 55 separated by bands 56 of equal width. Gear 17' is shaped complementarily by having similar grooves and bands interfitting with those of roller 16", whereby adjustment of the axes of the rollers to separate them further will increase the size of the individual streams passing through the clearances 57 between the rollers.

It will be noted that the disintegrating rolls can be in the form of long spin gears or plain rolls with their surfaces roughened or knurled. In other words, it has been found that by the use of rolls with smaller teeth, more efficient spinning of wool can be accomplished.

In further reference to Figure 4 on the drawing, it will be observed that the gear 44 is adjustably mounted on an inclined extension of the rack 46, and in addition to horizontal adjustment with the rack, the gear can be vertically adjusted on the inclined extension, all adjustments being relative to the spin gear 43. Both gears 43 and 44 can be water-cooled.

Many obvious modifications in the means herein described may be made without departing from the spirit and scope of the present invention, as defined in the appended claims.

What is claimed is:

1. In apparatus for the production of mineral wool from molten material, wherein the molten material flows downwardly from the melting cupola at high temperatures and is formed into fine fibre filaments under relatively low temperature values during downward travel of the material, means for cooling the material and preparing it for fibre development, said means including a pair of rotating rolls positioned on opposite sides of the flow-path of the molten material from the cupola to form a trenching path of definite dimensions therebetween for the flowing material, said rolls being relatively adjustable to control the roll spacing and therefore the thickness of the stream flow-path through the rolls, each of said rolls being internally water cooled to provide rapid cooling action on the flowing material, the axes of the rolls extending in parallelism and parallel with the direction of width of the stream flow-path and providing a stream flow-path of definite dimensions to control the dimensional characteristics of the onflowing stream, a fluted roll mounted for rotation below one of the pair of rolls with the axis of said roll extending in parallelism with the axes of the pair of rolls, the fluted roll being positioned relative to the flow path of said stream as to cause the roll flutes to intercept such flow to thereby produce disintegration of the stream form by the rotating flutes and divide the stream into individual increments of relatively small dimensions, said fluted roll being adjustable as to position and speed of rotation, a second rotatable fluted roll mounted in the vicinity of but spaced materially from the disintegrating fluted roll and having its axis parallel with the axis of the disintegrating roll, the respective axes of the fluted rolls being located on spaced-apart horizontal planes with the plane of the axis of the second fluted roll below that of the first fluted roll, said second fluted roll being individually adjustable as to height, said fluted rolls having individual power sources, said second fluted roll being positioned to receive and transfer stream increments from the first fluted roll and to project the same in a general definite direction en route to a settling chamber of the apparatus wherein the fibre development is completed.

2. Apparatus as in claim 1 characterized in that the apparatus includes a settling chamber located below the fluted rolls and having a top entrance of restricted area and positioned relative to the second fluted roll in a manner to present the restricted entrance in the path of the stream increments projected from the second fluted roll.

3. Apparatus as in claim 2 characterized in that the settling chamber presents a downward passage having the contour dimensions of the entrance for a material distance and then expanded, said chamber having a traveling foraminous bottom for collecting the falling fibres, and suction-creating means carried by the apparatus and positioned to be active through such bottom to thereby create a forced downward draft through the chamber with the speed of air movement greatest within such zone of restricted cross-sectional area.

4. Apparatus as in claim 1 characterized in that the pair of water-cooled rolls have their surface contours relatively formed to divide the content of the flowing stream within the trenching path into a plurality of spaced-apart streams of small width and located in a common plane extending parallel with the roll axes and with the streams flowing to the fluted disintegrating roll as individuals, whereby the disintegrating roll will produce rows of individual particle increments of the cooled molten material of generally similar dimensions for fibre development.

CHARLES D. RICHARDSON.

REFERENCES CITED

The following references are of record in the file of this patent:

UNITED STATES PATENTS

| Number | Name | Date |
|---|---|---|
| 2,018,478 | Whittier | Oct. 22, 1935 |
| 2,150,945 | Slayter | Mar. 21, 1939 |
| 2,230,272 | Slayter | Feb. 4, 1941 |
| 2,243,122 | Ramseyer | May 27, 1941 |
| 2,315,735 | Richardson | Apr. 6, 1943 |
| 2,318,243 | McClure | May 4, 1943 |
| 2,388,935 | Powell | Nov. 13, 1945 |
| 2,398,707 | Hawthorne et al. | Apr. 16, 1946 |
| 2,428,810 | Powell | Oct. 14, 1947 |

FOREIGN PATENTS

| Number | Country | Date |
|---|---|---|
| 10,836 | Great Britain | A. D. 1889 |
| 563,653 | France | Dec. 11, 1923 |